(12) United States Patent
Dobbins

(10) Patent No.: US 11,719,384 B2
(45) Date of Patent: Aug. 8, 2023

(54) OBJECT HOLDER INCLUDING A BISTABLE SPRING BAND

(71) Applicant: Jesus Dobbins, Miami Beach, FL (US)

(72) Inventor: Jesus Dobbins, Miami Beach, FL (US)

( * ) Notice: Subject to any disclaimer, the term of this patent is extended or adjusted under 35 U.S.C. 154(b) by 0 days.

(21) Appl. No.: 17/453,381

(22) Filed: Nov. 3, 2021

(65) Prior Publication Data

US 2022/0136648 A1 May 5, 2022

Related U.S. Application Data

(60) Provisional application No. 63/109,823, filed on Nov. 4, 2020.

(51) Int. Cl.
*F16M 13/02* (2006.01)
*F16M 11/20* (2006.01)
*F16M 11/04* (2006.01)

(52) U.S. Cl.
CPC ........ *F16M 13/022* (2013.01); *F16M 11/041* (2013.01); *F16M 11/20* (2013.01); *F16M 2200/08* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,984,760 A * | 1/1991 | Cohn | ............... | F16M 11/041 248/206.3 |
| 6,918,161 B2 * | 7/2005 | Gyongyosi | .......... | F16L 33/035 285/23 |
| 8,622,447 B1 * | 1/2014 | Wirtz | .................. | F16M 11/041 224/217 |
| 9,004,414 B2 * | 4/2015 | Durben | ..................... | F21S 4/10 248/301 |
| 9,182,077 B2 | 11/2015 | Dose | | |
| 9,605,790 B1 | 3/2017 | Alonzo et al. | | |
| 9,891,504 B2 | 2/2018 | Fromm | | |
| 9,963,267 B2 | 5/2018 | Karas | | |
| 10,244,862 B2 * | 4/2019 | Gallup | ................. | A45C 13/30 |
| 10,422,466 B2 * | 9/2019 | Papapanos | ........... | F16M 11/041 |
| 10,836,449 B2 * | 11/2020 | Lin | ....................... | B62K 19/40 |
| 10,900,608 B2 * | 1/2021 | Ahi | ..................... | F16M 13/022 |
| 2011/0278885 A1 * | 11/2011 | Procter | ............ | B64D 11/00153 297/135 |
| 2011/0308049 A1 * | 12/2011 | Sun | ...................... | H01F 7/0263 24/306 |

(Continued)

FOREIGN PATENT DOCUMENTS

DE 202018101299 4/2018

*Primary Examiner* — Monica E Millner
(74) *Attorney, Agent, or Firm* — Allen, Dyer, Doppelt + Gilchrist, PA

(57) ABSTRACT

An apparatus may include a band having opposing first and second ends, a medial portion between the first and second ends, and opposing first and second sides. The band may further include at least one clamp connected to the medial portion on the first side of the band and configured to hold an object. The least one clamp may be connected to the medial portion of the band at a location spaced apart from a center of the medial portion in a direction of the first end. The band may comprise a bistable spring changeable between an extended configuration and a coiled configuration.

20 Claims, 11 Drawing Sheets

(56) References Cited

U.S. PATENT DOCUMENTS

| | | | |
|---|---|---|---|
| 2012/0198680 A1* | 8/2012 | Durben | F21S 4/10 248/220.21 |
| 2012/0235001 A1* | 9/2012 | Somuah | B60R 11/0252 248/287.1 |
| 2013/0270129 A1* | 10/2013 | Johnson | A45F 5/00 29/592.1 |
| 2015/0184799 A1* | 7/2015 | Whitney | F16B 47/003 248/205.5 |
| 2015/0318885 A1* | 11/2015 | Earle | H04B 1/385 455/575.6 |
| 2016/0381259 A1* | 12/2016 | Johnson | G03B 17/561 348/158 |
| 2017/0314732 A1* | 11/2017 | Minn | F16B 2/22 |
| 2018/0209584 A1* | 7/2018 | Statesman | A45F 5/00 |
| 2020/0109812 A1* | 4/2020 | Yang | F16M 13/022 |

* cited by examiner

OBJECT HOLDER INCLUDING A BISTABLE SPRING BAND

CROSS-REFERENCE TO RELATED APPLICATIONS

This application claims the benefit of U.S. provisional application No. 63/109,823 filed Nov. 4, 2020, which is hereby incorporated herein in its entirety by reference.

TECHNICAL FIELD

This disclosure relates to holders for objects, and more particularly, to holders for objects such as electronic devices, for example.

BACKGROUND

There are a number of electronic devices on the marketplace, many of which do not come with integrated stands that enable the devices to be positioned at convenient angles for viewing in different situations. In this regard, special purpose holders are sometimes used for mounting an electronic device at a desired angle in specific applications, such as for mounting smartphones to a dashboard or in a cup holder in a vehicle for ease of viewing. While helpful for specific applications, such holders may provide little versatility with respect to other uses, and may also suffer from drawbacks such as size and ease of portability.

SUMMARY

An apparatus may include a band having opposing first and second ends, a medial portion between the first and second ends, and opposing first and second sides. The band may further include at least one clamp connected to the medial portion on the first side of the band and configured to hold an object. The at least one clamp may be connected to the medial portion of the band at a location spaced apart from a center of the medial portion in a direction of the first end. The band may comprise a bistable spring changeable between an extended configuration and a coiled configuration.

In an example embodiment, the location of the at least one clamp may be in a range between 30% and 40% of the length of the band measured from the first end. By way of example, the at least one clamp may be configured to hold an electronic device. In accordance with another example implementation, the at least one clamp may be configured to hold a board. In some embodiment, the at least one clamp may comprise a plurality of different clamps interchangeably connectable to the band at the location.

In one example implementation, the at least one clamp may include a base connected to the medial portion of the band, first and second arms coupled to the base, and first and second end pieces respectively coupled to the first and second arms opposite the base. Moreover, at least one of the first and second arms may be slidable within the base to releasably clamp the object between the first and second end pieces. In an example embodiment, the at least one clamp may be rotatably connected to the band.

In still another example embodiment, the apparatus may further include at least one suction cup connected to the medial portion on the second side of the band at a location between the at least one clamp and the first end. Moreover, in some implementations the apparatus may further include at least one other suction cup connected to the medial portion on the second side of the band and spaced apart from the center of the medial portion in a direction of the second end. In an example implementation, the apparatus may further include an elastomeric layer on at least a portion of the band.

DETAILED DESCRIPTION

Figure 1:
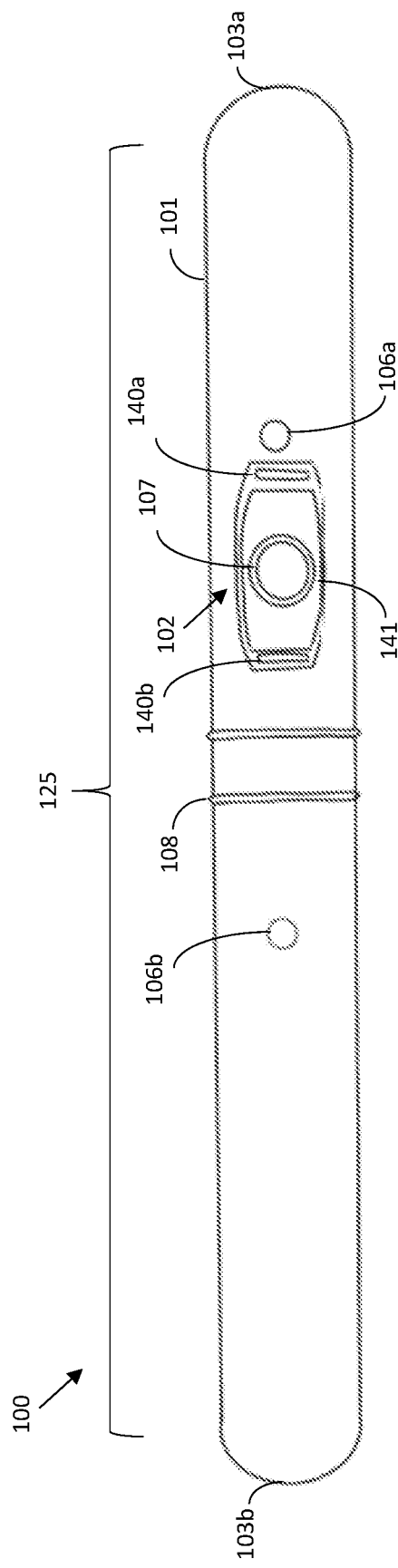
FIG. 1 is a front view of an electronic device holder in accordance with an example embodiment in an extended configuration.

Example embodiments will now be described more fully hereinafter with reference to the accompanying drawings, in which the example embodiments are shown. The embodiments may, however, be implemented in many different forms and should not be construed as limited to the specific examples set forth herein. Rather, these embodiments are provided so that this disclosure will be thorough and complete. Like numbers refer to like elements throughout, and prime notation is used to indicate similar elements in different embodiments.

As noted above, there are a number of electronic devices on the marketplace that do not come with integrated stands that enable the raising of the display screen to a more visible and optimal angle. It can be cumbersome to hold such electronic devices upright for an extended period of time, especially when the user needs both hands to complete another task. Various electronic device holders attempt to facilitate the stabilization and attachment of electronic devices, but these may suffer from drawbacks such as being big and bulky, not easily transportable, and/or providing little to no versatility. Other holders such as tripods may be cumbersome to carry around and are generally only meant to rest on a horizontal surface. For example, tripods (and many other electronic device holders) typically cannot adhere to surfaces such as glass, plastic, stainless steel, ceramic tile, and other smooth nonporous surfaces. In some instances custom support stands or holders are created for respective electronic device, yet these will typically be incompatible with other types of electronic devices with different form factors.

Referring initially to FIGS. 1-5, a holder 100 is first described which illustratively includes a semi-ridged multipurpose band 101 including a clamp 102 for holding electronic devices 110, such as smartphones, electronic measuring devices, etc., as will be discussed further below. The band 101 serves as a support stand or hanger that secures devices 110 either horizontally or vertically (or at other selectable angles). In the present example, a plurality of suction cups 106a, 106b are carried by the band 101 which allow it to adhere to glass and other relatively smooth, nonporous surfaces.

Figure 2:
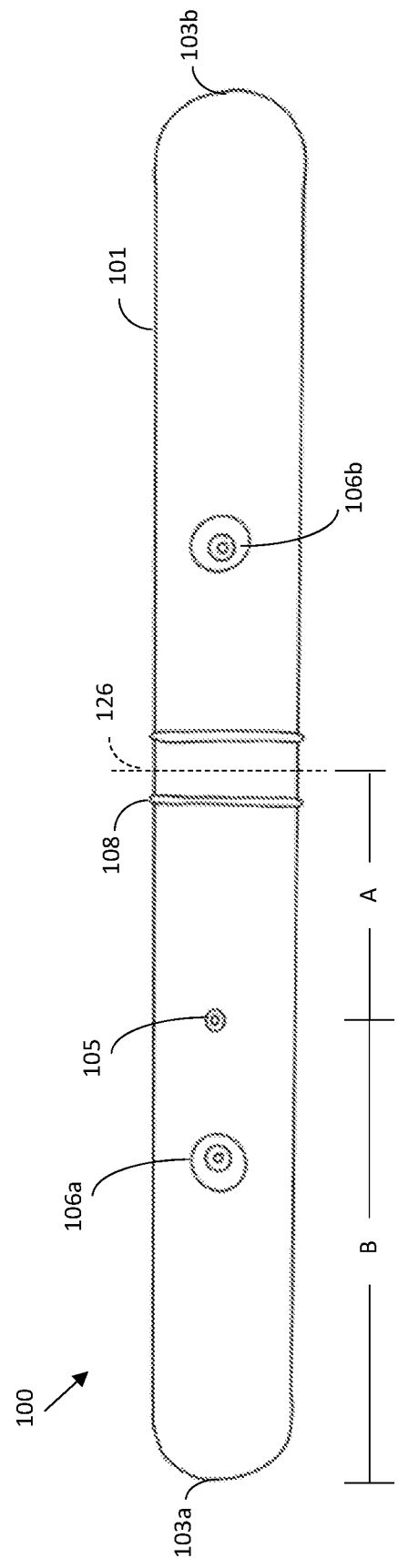
FIG. 2 is a back view of the electronic device holder of FIG. 1 in the extended configuration.
Figure 3:
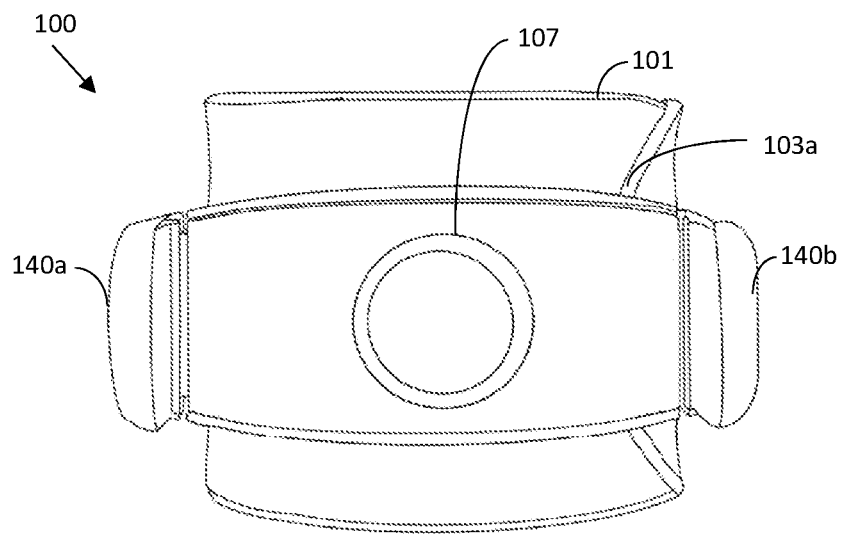
FIG. 3 is a front view of the electronic device holder of FIG. 1 in a coiled configuration.
Figure 4:
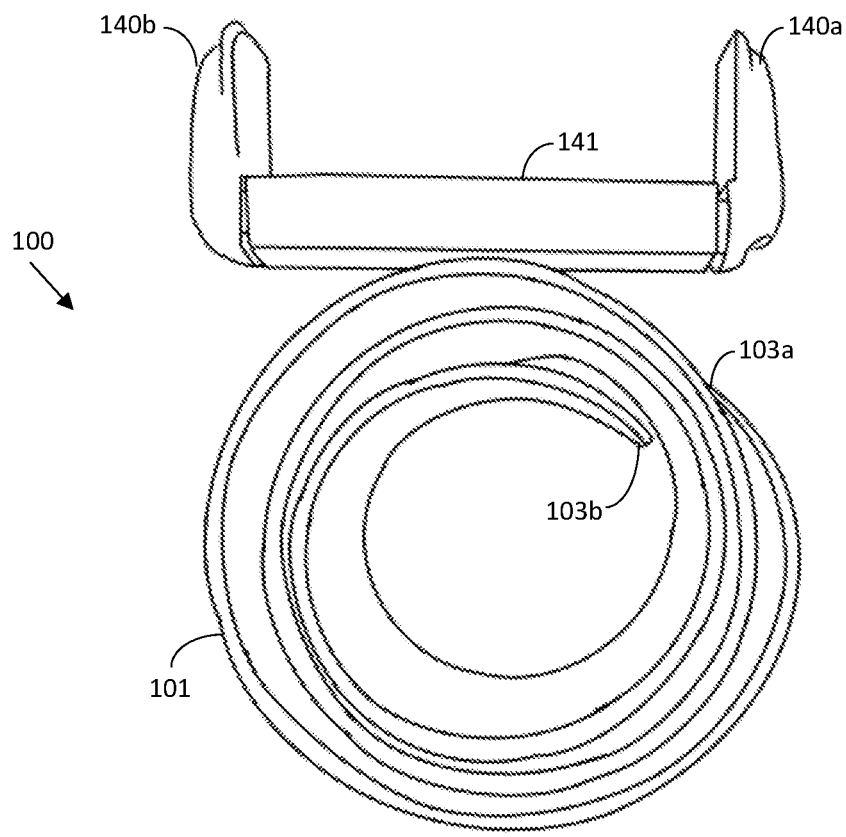
FIG. 4 is a top view of the electronic device of FIG. 1 in the coiled configuration.
Figure 5:
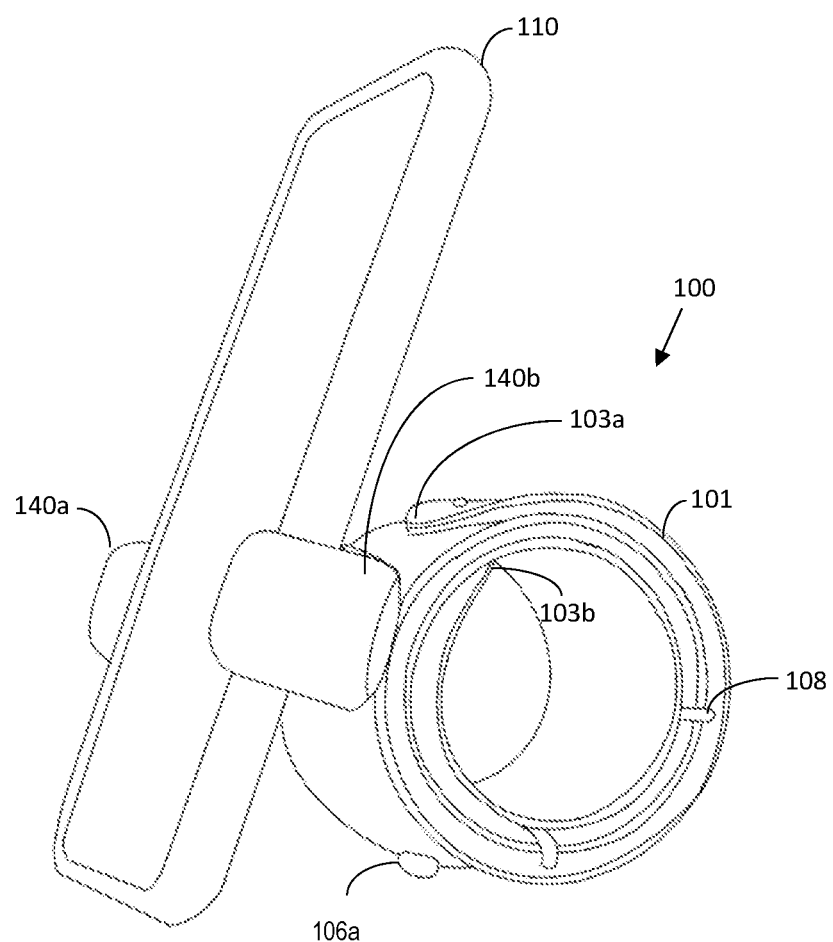
FIG. 5 is a perspective view of the electronic device holder of FIG. 1 in the coiled configuration and holding a smartphone.

The band 101 is a bistable spring including a thin substrate (e.g., a metal such as steel), which may have an elastomeric or rubber coating on some or all of the band. The bistable spring is changeable or switchable between two stable configurations, namely an extended configuration (as shown in FIGS. 1-2) and a coiled configuration (as shown in FIGS. 3-5). When the semi-rigid band 101 is bent, it automatically curls inward, securely wrapping around an object. More particularly, in the coiled configuration, the band 101 can wrap around objects such as, but not limited to, a user (e.g., arms/legs), trees, chairs, poles, bag straps, bottles 114 (see FIG. 7), doors (see FIGS. 10-11), railings and other cylindrical objects. The band 101 illustratively includes first and second opposing ends 103a, 103b and a medial portion between the first and second ends.

Figure 12:
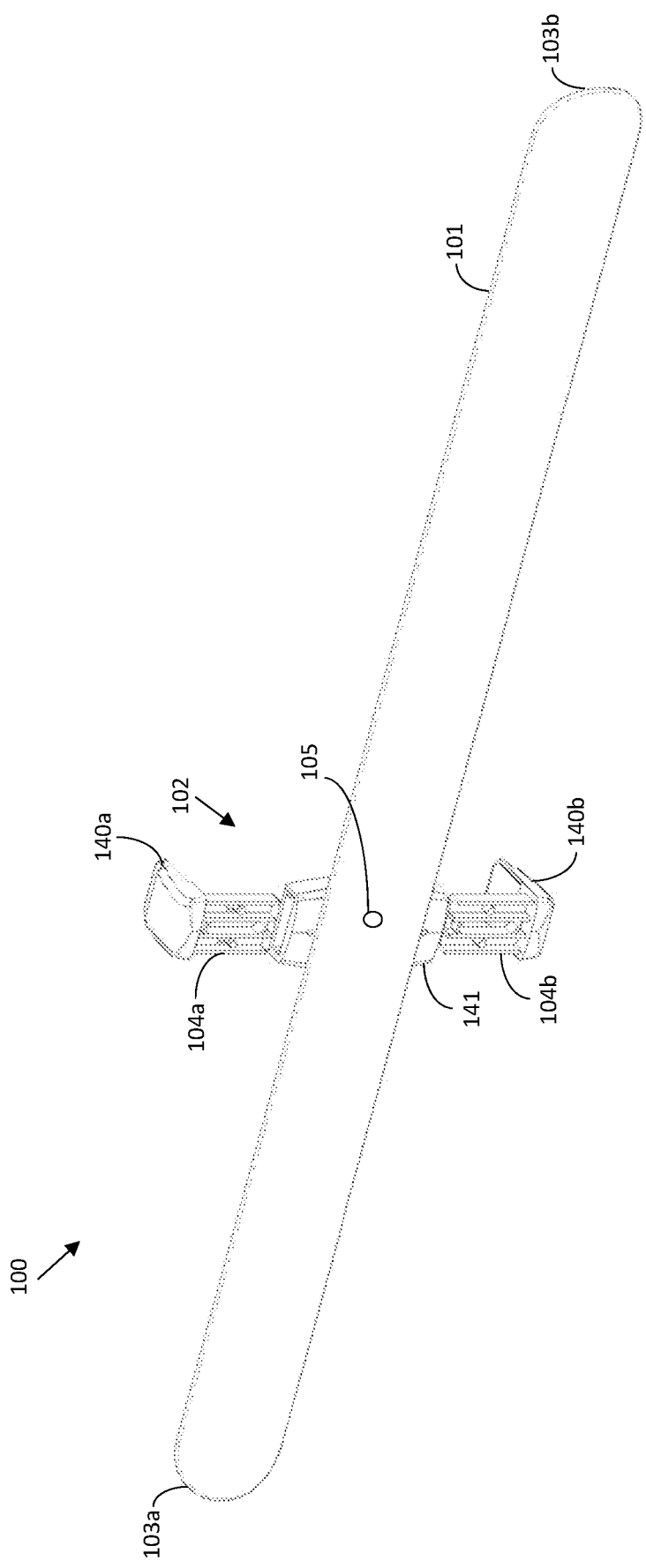
FIG. 12 is an exploded rear view of the clamp of the holder of FIG. 1.

In the illustrated example, the clamp 102 includes two spring-loaded, slidable, lock-and-release arms 104a, 104b that clamps to the electronic device 110 to hold it securely in place. The clamp 102 can vary in sizes to fit larger or smaller electronic apparatuses. An example implementation of the clamp 102 is shown in FIG. 12, in which the arms 104a, 104b have respective end pieces or caps 140a, 140b thereon and are configured to slide in and out of a base 141 of the clamp to adjust for different sizes of electronic devices 110. However, it will be appreciated that other types of clamps for holding electronic devices or other objects may be used in different embodiments, and in some configurations more than one such clamp may be connected to the band 101. For example, different configurations and shapes of clamps may be used such as a diamond, a circle, oval, or a polygon, where different shapes may be useful for different applications. By way of example, the clamp 102 may be made out of plastic, wood, metal, or other suitable materials.

The base 141 of the clamp 102 may be connected to the medial portion of the band at a location A spaced apart from a center of the medial portion (illustrated by a dashed line 126 in FIG. 2) by a distance B in a direction of the first end 103a. In an example embodiment, the location of the clamp 102 may be a distance B from the first end 103a, which is a range between 30% and 40% of the total length of the band (measured from the first end). In an example implementation, the band 101 has a length of 19.75 inches and a width of two inches. Moreover, the end 103b and suction cup 106b are approximately 5.87 inches apart, while the end 103a and suction cup 106a are approximately 5.3 inches apart, which is closest to the clamp 102. By way of example, the band 101 may have a width in a range of 1.5 to 2.5 inches, and a length in a range of 18-22 inches, although other dimensions may be used in different embodiments. Generally speaking, the length and width of the band 101 determines how well the band will support the object it is holding, and the larger and thicker the band is the more stability it provides. The clamp 102 may be attached by a rivet or screw 105 to the semi-rigid band. In some embodiments, a cover 107 (e.g., rubber) may be positioned over the rivet or screw 105, if desired. The rivet or screw 105 will enable the spring-loaded lock-and-release clamp to rotate 360 degrees. In other embodiments, a bolt or nail/pin may be used to rotatably secure the clamp 102 to the band 101.

The clamp 102 is positioned in the offset position to allow the flexible band 101 to completely roll or coil up. For example, placing the clamp 102 in the center of the medial portion 125 of the band 101 may generally inhibit the band from rolling or coiling up completely because of the way in which the clamp 102 would stick out. Another potential drawback of a centrally located clamp 102 is that this can make carrying of the holder 100 more difficult, as both ends 103a, 103b may be sticking out instead of being neatly coiled up. Furthermore, placing the clamp 102 near the ends 103a or 103b may be undesirable because when the clamp holds the electronic device 110, the weight of the electronic device may drag the end down and cause the flexible band 101 to uncoil. This may otherwise prevent the band 101 from sustaining itself when wrapped around cylindrical objects like trees, bottles 114, etc.

In the illustrated example, the holder 101 includes suction cups 106a and 106b on the opposite side of the band 101 from the release clamp 102. The suction cup 106a is positioned between the location of the clamp 102 and the first end 103a, while the suction cup 106b is positioned between the center line 126 and the second end 103b of the band. In some embodiments, more than one suction cup 106a or 106b may be used. For example, a pair of adjacent suction cups 106a and/or a pair of suction cups 106b may be used in some configurations. Generally speaking, the suction cup(s) 106a may be positioned relatively close to the clamp 102 for stabilization purposes. However, the suction cup(s) 106a may also be placed just out of reach of the clamp 102 so when the clamp rotates 360 degrees it will not touch or interfere with the suction cups. The second suction cup(s) 106b may be placed further out along the flexible band 101 to facilitate weight distribution of the electronic device 110 (or another object being held in different embodiments). It may also be desirable not to position the suction cups 106a, 106b too close to the ends 103a, 103b because this may not allow the band 101 to coil up properly or completely. More particularly, placing the suction cups 106a, 106b too close to the ends 103a, 103b may cause the ends to stick out and not reach the fully coiled position.

By way of example, the first suction cup(s) 106a may be positioned in location about 20-30% of the length of the band 101 measured from the first end 103a, and the second section cup(s) 106b at a location about 60-70% of the length of the band measured from the first end. Again, these locations are far enough apart to help fully support the band 101 while in the extended position, yet while still allowing the band to fully coil when in the coiled configuration and not cause the ends 103a, 103b to stick out, as discussed further above.

The suction cups 106a, 106b enable the band 101 to adhere to multiple surfaces. For example, these may include smooth, nonporous regular surfaces as well as irregular surfaces. More particularly, the suction cups 106a, 106b may be adhered to surfaces such as glass and other smooth, nonporous surfaces, in addition to being capable of securely wrapping around objects such as poles, bottles, beams, etc. This provides numerous options for users to view electronic devices at eye level in multiple different scenarios without having to physically hold the electronic device in place. Various sizes of suction cups 106a, 106b may be used, and the size of the suction cups generally determines the weight the band 101 can support while adhered to smooth, nonporous surfaces, that is, the larger the size or number of suction cups 106a, 106b the more weight the band 101 can hold while adhered to surfaces. The suction cups 106a, 106b may be made out of flexible synthetic materials such as PVC, plastic, or neoprene, for example. In some embodiments, respective holes may be formed in the band 101 through which the back of the suction cups 106a, 106b may be inserted to provide a friction fit. In other embodiments, a screw-in configuration with a threaded shaft and a nut may be used, which may allow for the suction cups 106a, 106b to be more readily interchanged if the suction cups become worn and begin to lose their grip.

Figure 7:
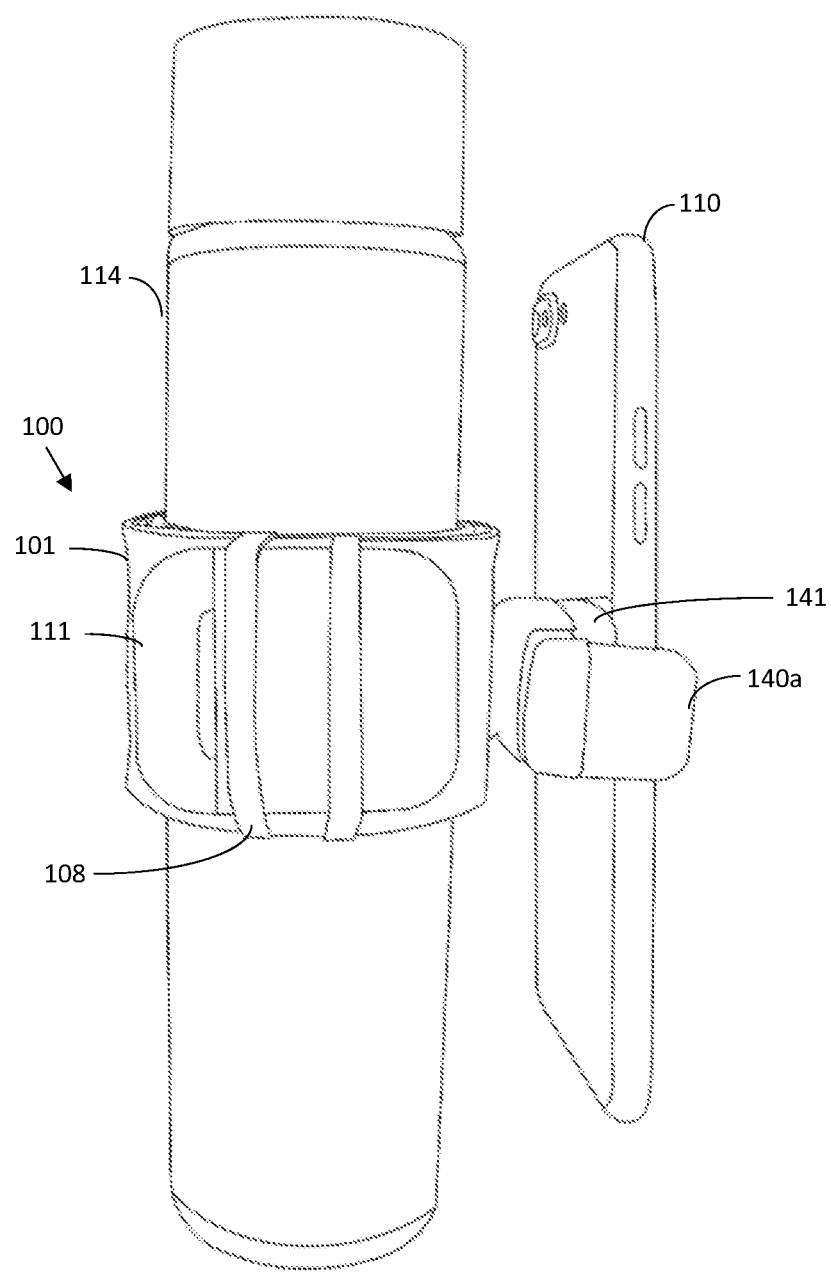
FIG. 7 is a perspective side view of the electronic device holder of FIG. 6 in the coiled configuration and wrapped around a bottle.
Figure 8:
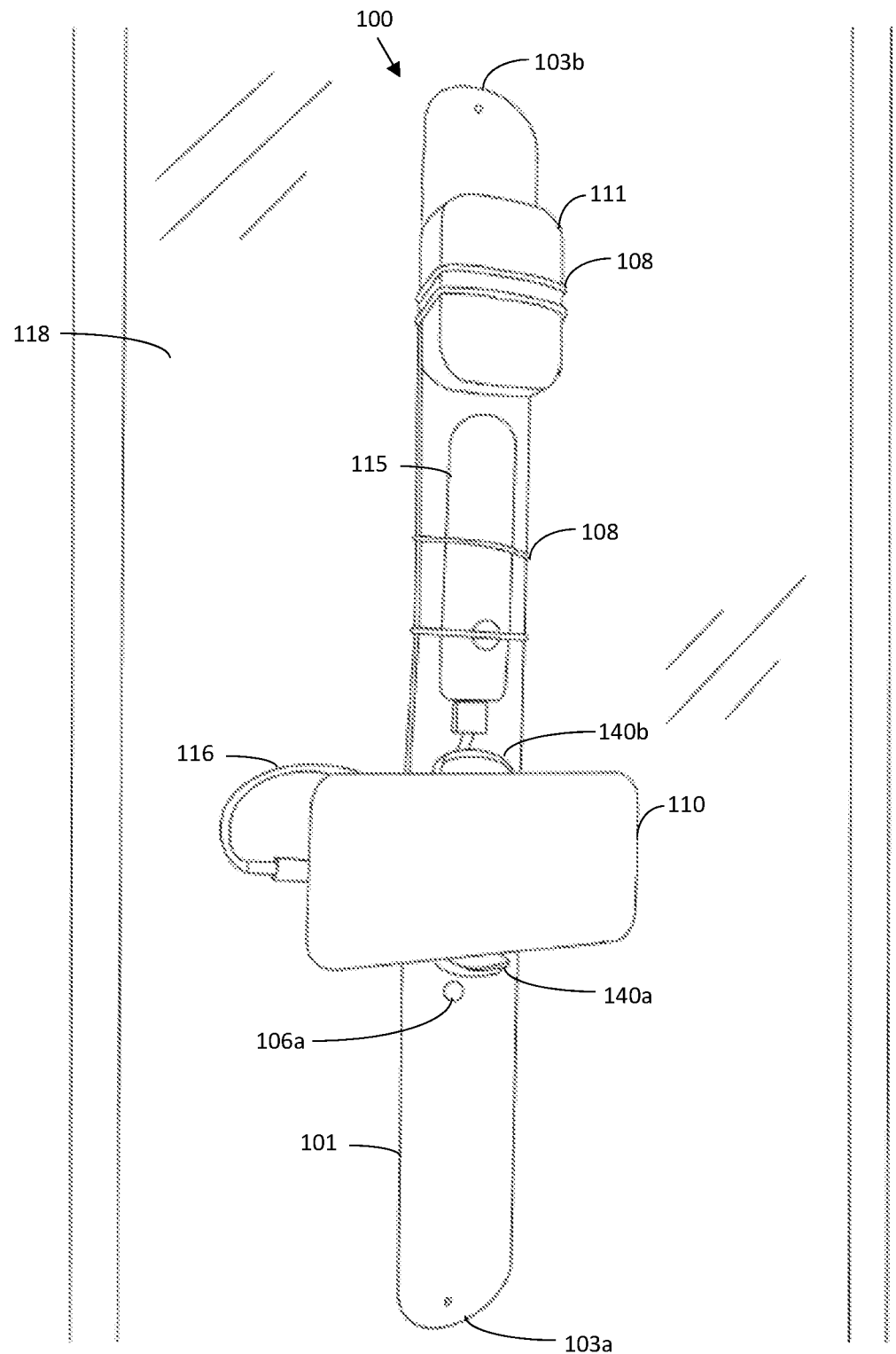
FIG. 8 is a perspective view of another example embodiment of the electronic device holder of FIG. 1 mounted to a glass panel with included suction cups.

Referring additionally to FIGS. 7 and 8, in some embodiments the holder 100 may also be used to hold other items in addition to the electronic device 100, such as in-ear headphone cases 111 and portable chargers/power pack 115. In this regard, one or more optional elastic bands 108 (e.g., fabric covered elastic bands) may be moved up and down along the flexible band 101 for securing items to the band. The elastic bands 108 can either be permanently attached or removable. The elastic bands can also be completely removed. The elastic bands 108 can expand to fit and securely hold items such as the in-ear headphone case 111 or portable charger 115 to the band 101. Other suitable forms of attachment for the case 111 or charger 115 may also be used, and in certain embodiments such attachments may be integrally formed with the band 101 (e.g., at least partially under the elastic coating, etc.). In the example illustrated in FIG. 7, the band 101 is in the fully coiled configuration and wrapped around the bottle 114 to hold it in place. In the illustrated example, a small space is present between the clamp 102 and the band 101, which enables the user to coil a charging cable 116 behind the clamp 102 that connects the portable charger 115 to the electronic device 110. This keeps the charging cable 116 securely attached and out of the way.

In the example of FIG. 8, the band 101 is in the fully extended configuration and mounted to a glass panel (e.g., a mirror or shower door/wall) 118 via the suction cups 106a, 106b. The band 101 is shown in a vertical orientation, but could instead be mounted to the glass panel 118 or other surface in a horizontal or angled orientation as well, if desired. The elastic bands 108 may also serve to secure the overlapping end 103a or 103b of the band 101 that is on the outside of the coil when the band is wrapped around objects and help keep the band from uncoiling.

Figure 9:
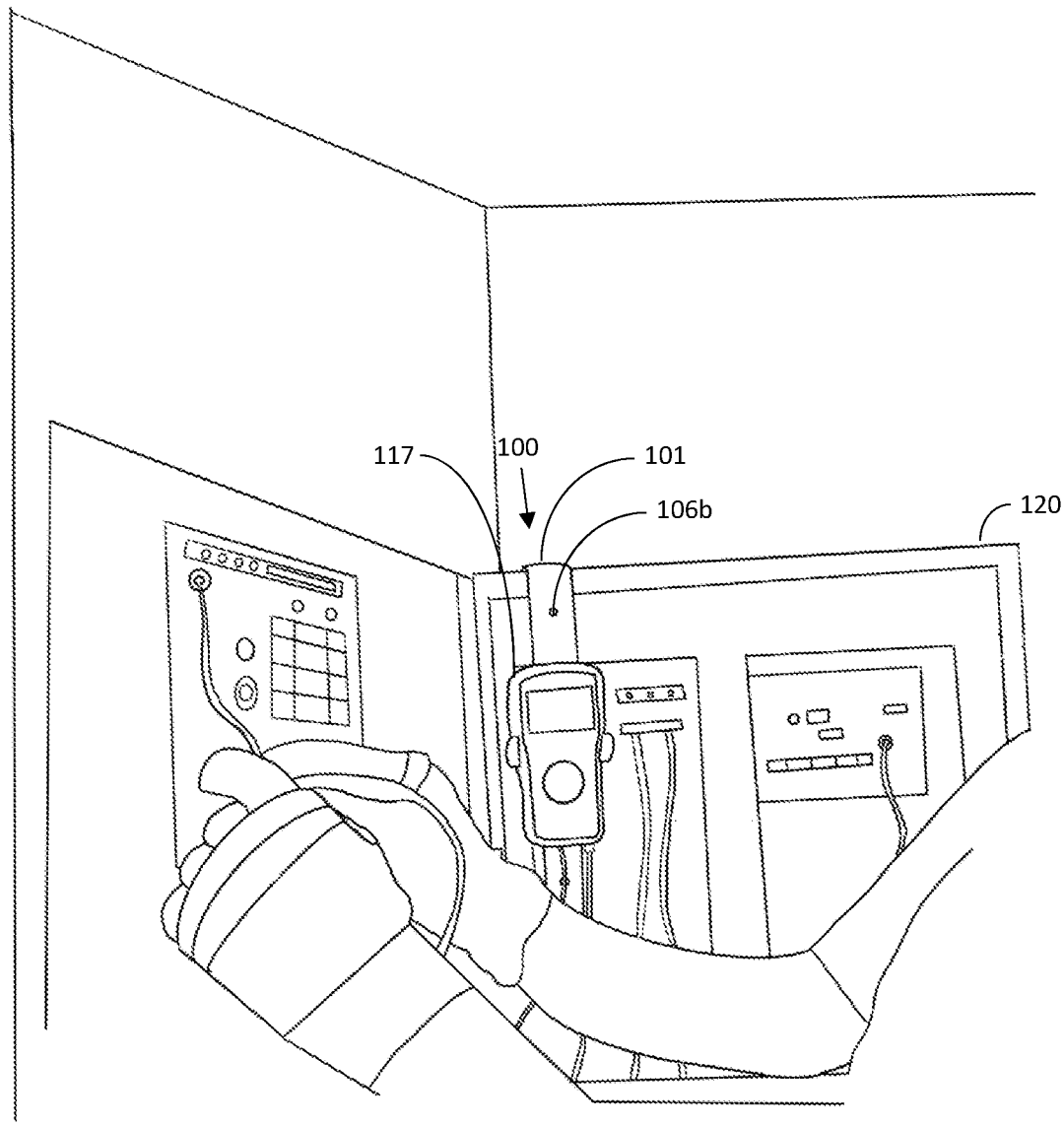
FIG. 9 is a perspective view of an example embodiment of the electronic device holder of FIG. 1 holding an electronic measuring apparatus.

Turning to another example use case shown in FIG. 9, here the holder 100 is used to hold an electronic measuring device 117 (e.g., a multi-meter, signal analyzer, etc.) in place for a technician who needs to use both hands to work. In the illustrated example, the band 101 is positioned on a circuit panel door 120 while holding the electronic measuring apparatus 117. The suctions cups 106a, 106b hold the backside of the band 101 to the inside of the panel door 120, while the end 103a is wrapped over the top of the door (i.e., in a partially coiled position) to act as a hanger on the end of the band for additional support to hold up the weight of the device 117. The electronic measuring apparatus 117 is securely held in place by the retractable arms 104a, 104b and end caps 140a, 140b of the release clamp 102. It should be noted that the retractable arms 104a, 104b can secure both regular and irregular objects within the clamp 102, and in some embodiments different arm shapes and configurations may be used for different embodiments, as will be discussed further below. In the present example, the technician is able to use both hands to work while still being able to view the measuring apparatus and have it in close proximity.

Figure 10:
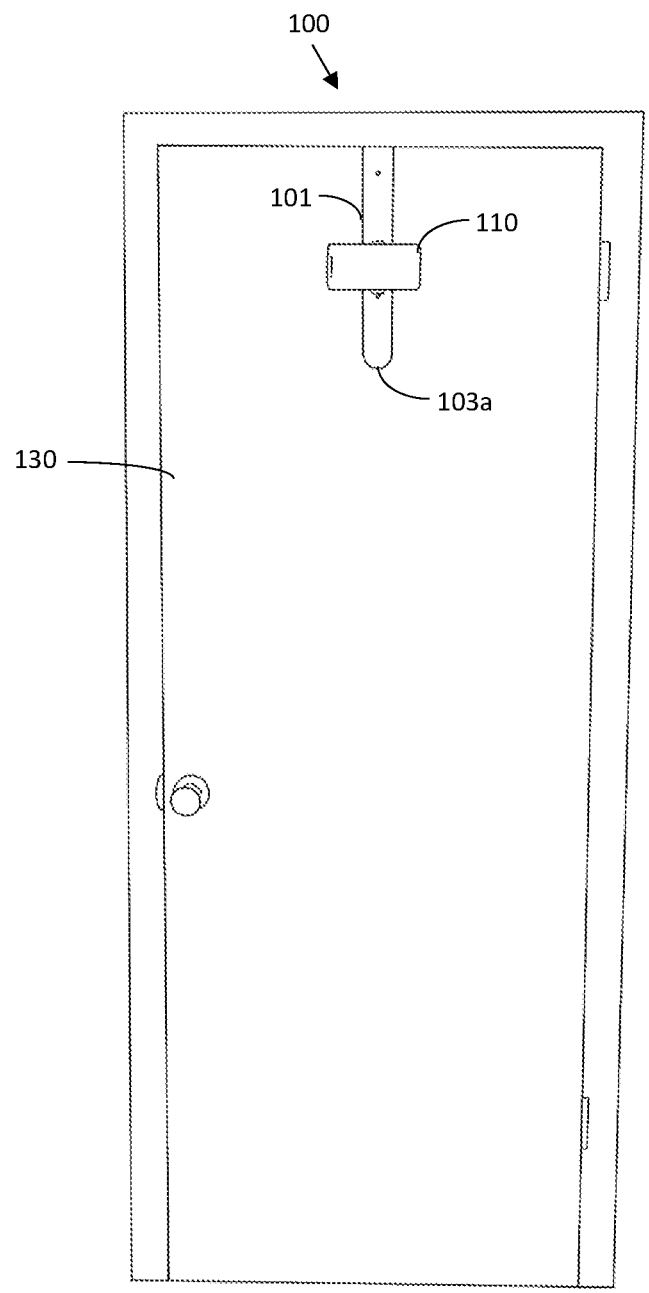
FIG. 10 is a perspective view of an example embodiment of the electronic device holder of FIG. 1 connected to a door and holding a smartphone.
Figure 11:
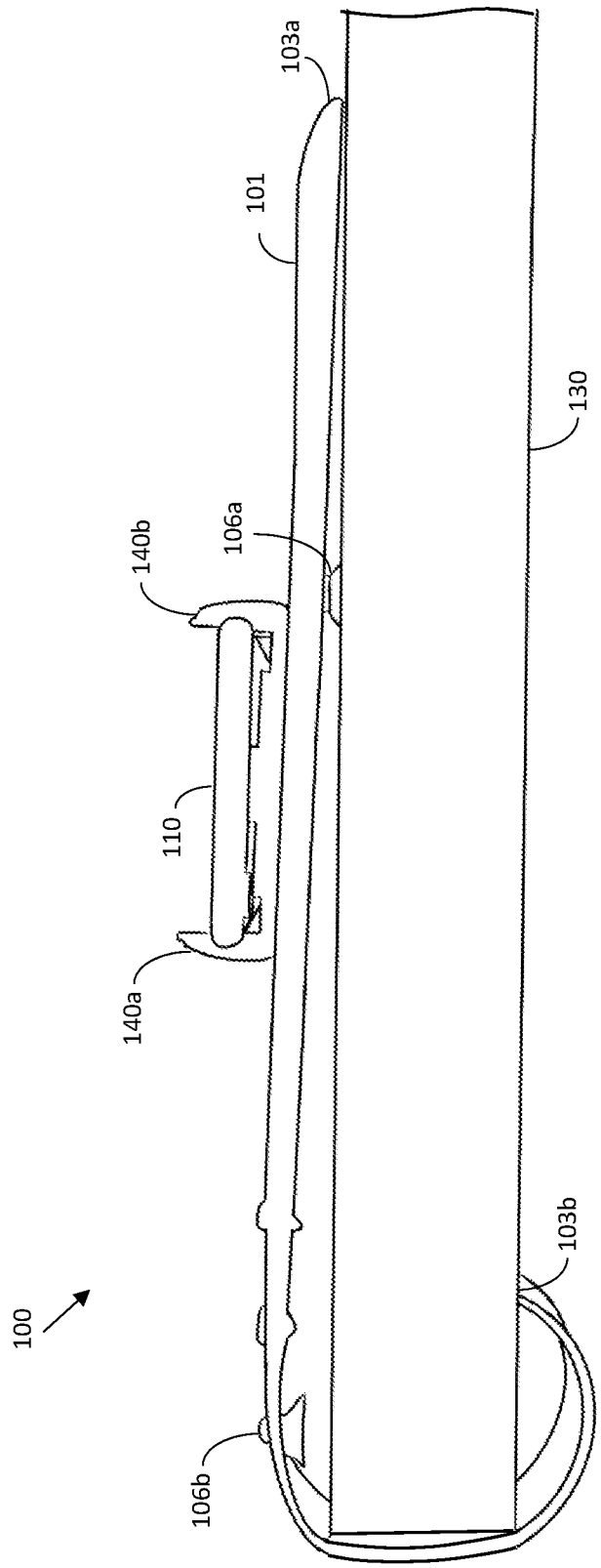
FIG. 11 is a side view of the electronic device holder of FIG. 10.

Another similar application is shown in FIGS. 10-11. Here, the holder 100 is similarly positioned over the top of a door 130 with the end 103b coiled around the top of the door, and one or both of the suction cups 106a, 106b can be stuck to the front of the door, although they do not have to be stuck to the door.

Figure 6:
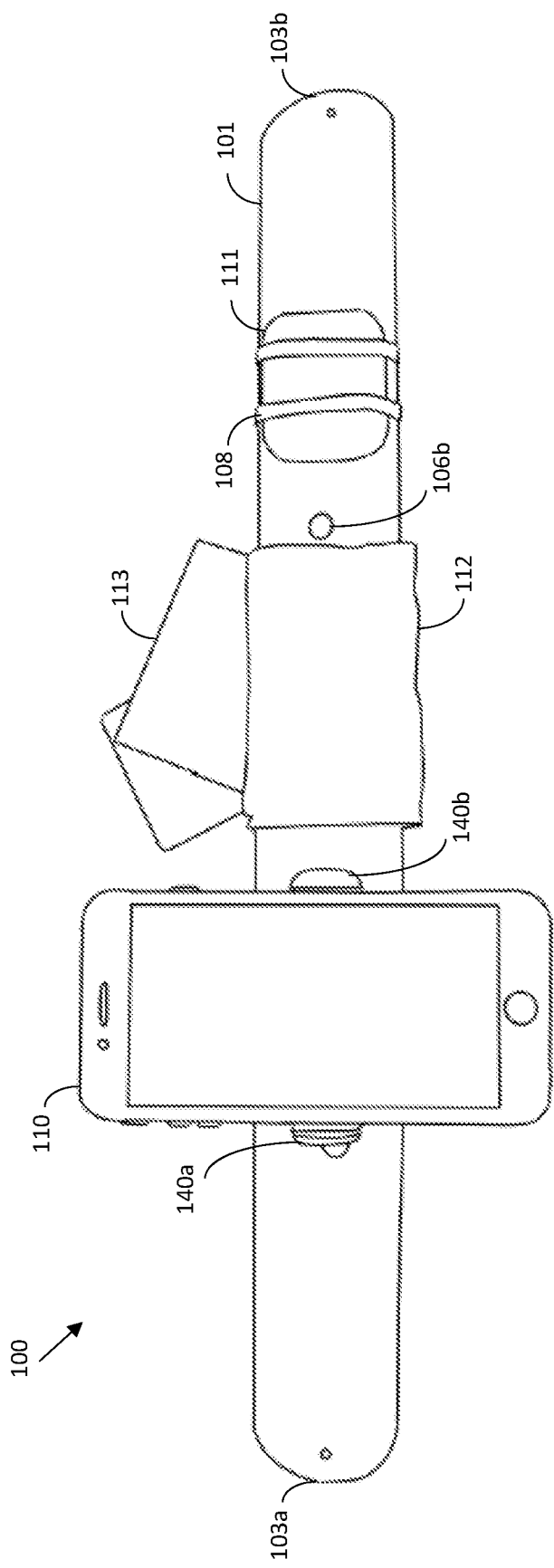
FIG. 6 is a front view of the electronic device holder of FIG. 1 in the extended configuration holding a smartphone and including additional accessories thereon in accordance with an example embodiment.

In the example embodiment shown in FIG. 6, a storage compartment/pouch/pocket 112 is also be attached to the band 101. The storage pouch 112 can be either permanently attached or removable from the band 101. The storage pouch 112 may comprise a flexible material (e.g., Lycra) that can expand when the items are being stored inside. By way of example, the pouch 112 may have a width up to a width of band 101, and different links to accommodate different types of objects. By way of example, the storage pouch 112 may be useful to store items 113 such as driver's licenses, identification cards, electronic key fobs, facial coverings, jewelry, cash money, credit cards, coins, key tags, gum/mints, band aids, hair accessories, lip balm, small make up kits, etc. The storage compartment/pouch 112 may also include a closing mechanism such as a button, zipper, clasp, or draw string to close it to prevent items from falling out. In some embodiments, the pouch 112 is able to move freely along the band 101 to suit the user's needs, and the user may completely remove the pouch if desired. The pouch or pocket 112 may alternatively be integrally formed with or as part of the band 101 in some embodiments.

In accordance with one example implementation, the band 101 (or elastomeric coating on the band) may incorporate a photo-luminescent or phosphorescent material so that it glows in the dark. The illumination of the band 101 at night or in the dark serves to enhance visibility to the user. If the user is walking in the dark and has the band 101 wrapped around his or her bag, purse, bottle, arm/leg, walking stick, etc., it can help increase their visibility. Moreover, a driver or biker can better see the user at night when the band 101 is glowing or illuminating in the dark. Additionally, if a technician is in a dark place like the crawlspace of an office building where light is not readily available, the glow in the dark functionality will make it easier for the technician to locate the holder 100. In this regard, one or more lights (e.g., LED lights) and corresponding battery source may also be coupled to the band 101 in some embodiments.

In another alternative configuration, the suction cups 106a, 106b may be replaced with nano-suction technology. This could be achieved by covering the backside of the band 101 with a nano-suction film. By doing so, the band 101 will adhere to relatively smooth, nonporous surfaces just like it would with the suction cups 106a, 106b. Still another implementation may include a small hook-like attachment on the band 101 that enables the user to hang keys or a key ring from the band.

The holder 100 described herein advantageously provides a versatile, relatively light-weight accessory for electronic devices 110, 117 which can adhere to smooth nonporous surfaces or be wrapped around objects while securely holding the electronic device at a desired orientation. The holder 100 also serves as a free-standing support platform to securely hold electronic devices 110, 117 in place. Moreover, it is portable with enhanced stability, functionality, and durability. The versatility of the holder 100 allows it to serve as a multipurpose electronic device holder that can be used across different applications and industries. The holder may be carried on a walking stick, bag strap/handle, bottle, belt, etc. Current electronic device holders, stands, and tripods are typically designed to be carried by hand or in a bag. This may be disadvantageous in that storing a relatively bulky stand or tripod in a bag takes up space and adds unnecessary weight. The holder 100 can instead be wrapped around the outside strap or handle of a bag/purse, thus not taking up any room inside the bag. Additionally, users may be able to quickly locate and utilize the holder 100 because of its accessibility on the bag straps, instead of struggling to find it in an otherwise cluttered bag.

If the user does not carry a bag, he or she may instead carry a bottle or walking stick that the band 101 can readily be wrapped around. The holder 100 may also be wrapped around a utility belt carried by a technician allowing him to use both hands to work. With the inclusion of the elastic bands 108 on the band 101, the holder 100 is also able to securely hold in-ear headphone cases 111, portable chargers 115, and the like. In one application, if the user attaches a camera to the holder 100, he or she can also attach a portable charger 115 with the elastic bands and have the charger powering the camera while being securely attached. This is advantageous if the user is filming in a studio and the camera is running low on battery, and/or a power outlet is not readily available.

Figure 13:
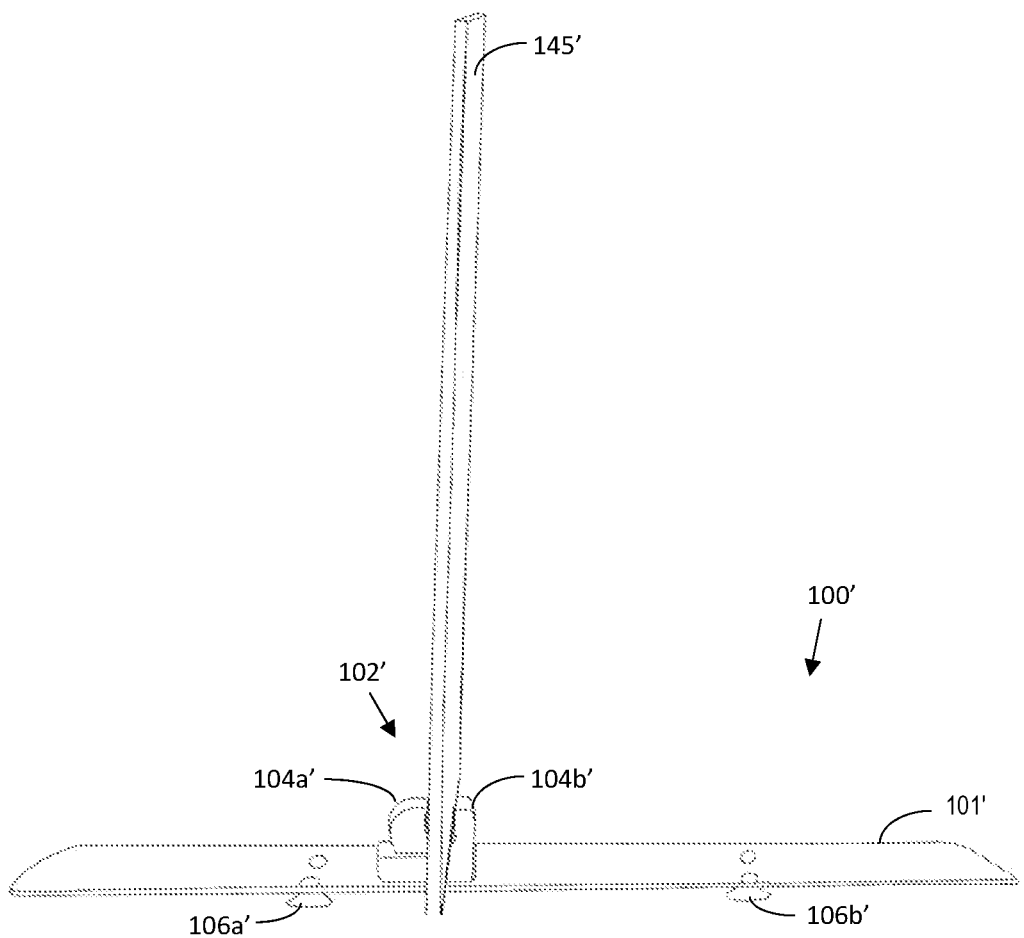
FIG. 13 is a side view of another holder which may be used for holding boards in accordance with an example embodiment.

As noted above, the holder 100 may provide certain advantages over typical configurations, such as a greater versatility in both methods of attachment and electronic devices and other objects that it can hold. To this end, another example embodiment of a holder 100' is shown in FIG. 13 that includes a clamp 102' that can similarly be mounted to the band 101' to hold different items such as a sign board 145' (e.g., posters, foam boards, wooden boards, etc.), plastic or acrylic boards/substrates, etc. In the clamp 102', the arms 104a', 104b' may be spring biased and slidable as discussed above, or they may be fixed and provide a friction fit with the board, for example. In such embodiments, the band 101' may otherwise be mounted and utilized as discussed above (e.g., by wrapping around an object and/or being mounted with suction cups 106a', 106b'), with the exception that an object such as a sign, etc., is being held instead of an electronic device 110.

In the extended configuration, the holder 100 may also serve as a "selfie" stick. That is, when the band 101 is in the fully extended configuration, a camera or smartphone attached to the band 101 may be held just beyond arm's length from the user to take a photo or video of themselves.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

The invention claimed is:

1. An apparatus comprising:
a band having opposing first and second ends, a medial portion between the first and second ends, and opposing first and second sides; and
at least one clamp connected to the medial portion of the band on the first side of the band at a location spaced apart from a center of the medial portion in a direction of the first end, the at least one clamp being configured to hold an object;
wherein the band comprises a bistable spring changeable between an extended configuration and a coiled configuration.

2. The apparatus of claim 1 wherein the location of the at least one clamp is in a range between 30% and 40% of the length of the band measured from the first end.

3. The apparatus of claim 1 wherein the at least one clamp is configured to hold an electronic device.

4. The apparatus of claim 1 wherein the at least one clamp is configured to hold a board.

5. The apparatus of claim 1 wherein the at least one clamp comprises a plurality of different clamps interchangeably connectable to the band at the location.

6. The apparatus of claim 1 wherein the at least one clamp comprises:
a base connected to the medial portion of the band;
first and second arms coupled to the base; and
first and second end pieces respectively coupled to the first and second arms opposite the base;
wherein at least one of the first and second arms is slidable within the base to releasably clamp the object between the first and second end pieces.

7. The apparatus of claim 1 wherein the at least one clamp is rotatably connected to the band.

8. The apparatus of claim 1 further comprising at least one suction cup connected to the medial portion on the second side of the band at a location between the at least one clamp and the first end.

9. The apparatus of claim 8 further comprising at least one other suction cup connected to the medial portion on the second side of the band and spaced apart from the center of the medial portion in a direction of the second end.

10. The apparatus of claim 1 further comprising an elastomeric layer on at least a portion of the band.

11. An apparatus comprising:
a band having opposing first and second ends, a medial portion between the first and second ends, and opposing first and second sides;
a clamp connected to the medial portion on the first side of the band at a location spaced apart from a center of the medial portion in a direction of the first end, the clamp configured to hold an electronic device; and
at least one suction cup connected to the medial portion on the second side of the band at a location between the clamp and the first end;
wherein the band comprises a bistable spring changeable between an extended configuration and a coiled configuration.

12. The apparatus of claim 11 wherein the location of the clamp is in a range between 30% and 40% of the length of the band measured from the first end.

13. The apparatus of claim 11 wherein the clamp comprises:
a base connected to the medial portion of the band;
first and second arms coupled to the base; and
first and second end pieces respectively coupled to the first and second arms opposite the base;
wherein at least one of the first and second arms is slidable within the base to releasably clamp the electronic device between the first and second end pieces.

14. The apparatus of claim 11 further comprising at least one other suction cup connected to the medial portion on the second side of the band and spaced apart from the center of the medial portion in a direction of the second end.

15. The apparatus of claim 11 wherein the at least one clamp is rotatably connected to the band.

16. The apparatus of claim 11 further comprising an elastomeric layer on at least a portion of the band.

17. An apparatus comprising:
- a band having opposing first and second ends, a medial portion between the first and second ends, and opposing first and second sides;
- a clamp connected to the medial portion on the first side of the band at a location spaced apart from a center of the medial portion in a direction of the first end, the clamp configured to hold a board; and
- at least one suction cup connected to the medial portion on the second side of the band at a location between the clamp and the first end;
- wherein the band comprises a bistable spring changeable between an extended configuration and a coiled configuration.

18. The apparatus of claim 17 wherein the location of the clamp is in a range between 30% and 40% of the length of the band measured from the first end.

19. The apparatus of claim 17 further comprising at least one other suction cup connected to the medial portion on the second side of the band and spaced apart from the center of the medial portion in a direction of the second end.

20. The apparatus of claim 17 further comprising an elastomeric layer on at least a portion of the band.

\* \* \* \* \*